United States Patent [19]

Niemann

[11] 3,713,624
[45] Jan. 30, 1973

[54] FENCE GUARD

[76] Inventor: Fred T. Niemann, 19 North Mount Prospect, Des Plaines, Ill. 60016

[22] Filed: Sept. 17, 1971

[21] Appl. No.: 181,424

[52] U.S. Cl. ...................256/32, 52/102, 47/33, 256/1
[51] Int. Cl. ................................................E04h 17/06
[58] Field of Search ....256/32, 33, 34, 19, 1; 98/102; 47/33, 37

[56] References Cited

UNITED STATES PATENTS

| | | | |
|---|---|---|---|
| 352,146 | 11/1886 | Oungst | 47/33 |
| 2,713,751 | 7/1955 | Hendrixson | 47/33 |
| 2,842,344 | 7/1958 | Todd | 47/33 UX |
| 3,277,606 | 10/1966 | Cohen | 47/33 |
| 3,384,351 | 5/1968 | Turner | 256/32 |
| 3,545,127 | 8/1968 | Jensen | 256/32 X |
| 3,676,952 | 1/1970 | Watts | 47/33 |

FOREIGN PATENTS OR APPLICATIONS

| | | | |
|---|---|---|---|
| 35,998 | 3/1930 | France | 52/102 |
| 18,225 | 1/1930 | Australia | 52/102 |

*Primary Examiner*—Dennis L. Taylor
*Attorney*—Dominik, Knechtel & Godula

[57] ABSTRACT

A fence guard for restricting the growth of grass, weeds and the like directly adjacent to or beneath a fence and for preventing a mower from striking the fence when mowing directly adjacent to it. In its most simple form, the fence guard is a length of material which is L-shaped in cross-section. A fence guard of this construction can be abutted against one or both sides of the fence. In a preferred embodiment, a pair of these fence guards are adapted to be affixed together to secure them against displacement.

4 Claims, 7 Drawing Figures

INVENTOR
FRED T. NIEMANN

ATTYS.

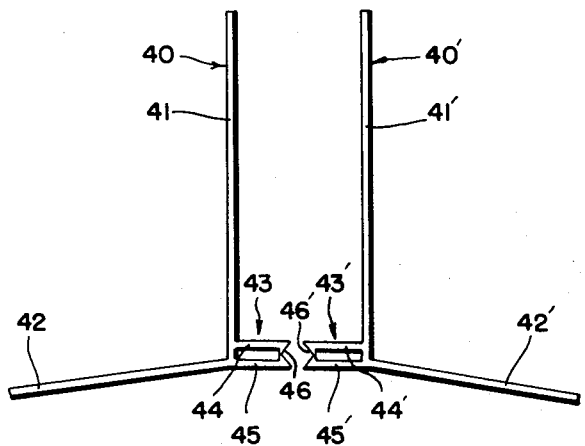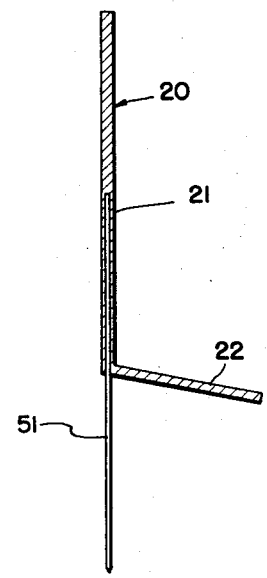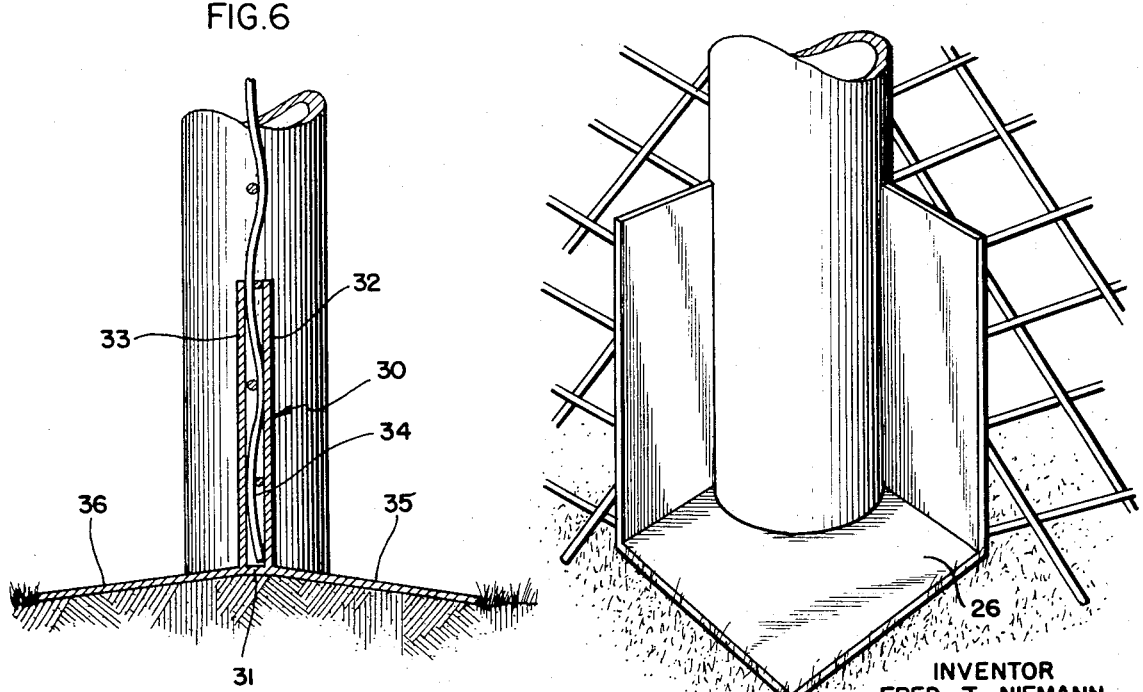

FENCE GUARD

This invention relates to an improved fence guard for restricting the growth of grass, weeds and the like directly adjacent to or beneath a fence and for preventing a mower from striking the fence when mowing directly adjacent to it.

The fence guard of the present invention in its most simple form comprises a length of material which is L-shaped in cross-section. The fence guard is installed simply by abutting one of its legs against the fence, with its other leg extending outwardly from the fence, substantially flat on the ground. The leg abutted against the fence helps in retaining the fence guard in position and further prevents a mower from striking the fence, when mowing directly adjacent it. The leg resting on the ground tends to cause any grass, weeds and the like to eventually die so that the growth only extends to its edge.

The fence guard advantageously is of a substantially rigid plastic which can be easily formed, however, other materials such as, for example, wood, tin, aluminum and the like can be used. The fence guard can be appropriately cut or otherwise formed to fit snugly about fence posts, as well as to provide inside and outside corners. In addition, the fence guard can be formed with means for affixing it in place, to prevent it from being dislodged.

The fence guard can be installed along only one side of the fence, or alternatively, along both of its sides. In the latter case, the legs extend outwardly from the fence, in opposite directions. When installing a fence guard on the opposite sides of a fence, a fence guard constructed in accordance with a second embodiment of the invention can be used, this fence guard being one having two spaced-apart, vertically disposed legs, with other legs extending outwardly, horizontally therefrom, in opposite directions. When installing a fence guard of this construction, the lower edge of the fence is disposed within the channel between the two vertical legs. Once installed, the fence guard functions as described above.

Numerous "fence guards" previously have been proposed, however, none of them offer the advantages of the fence guard of the present invention, nor are they as simple in construction, less expensive or as easily installed. For example, in U.S. Pat. No. 2,826,393, there is disclosed a fence guard which is of elongated construction and composed of a plurality of hollow sections of deltoid shape in cross-section. Each of these sections includes top portions sloping downwardly in obtuse angle relation toward each side of the hollow section from a longitudinal ridge. These sections are installed by placing them in the surface of the soil and centered under the fence. It is apparent that these fence guards are much more difficult to install than those of the present invention. Further still, they do not provide the protection afforded by the disclosed improved fence guards.

In U.S. Pat. No. 3,384,351, there is disclosed another fence guard in the form of a strip of flexible sheet material which is arched transversely intermediate its longitudinal edges, and is characterized by its inherent spring tension. One major disadvantage of this fence guard is that it must be installed during the erection of the fence, its construction being such that it cannot be installed with an existing fence, without first disassembling the latter. In addition, it does not afford the protection provided by the fence guard of the present invention.

Still another fence guard is disclosed in U.S. Pat. No. 3,393,897. This fence guard or barrier includes horizontal wall means disposed adjacent the fence and vertical outer walls which are imbedded in the ground. It suffers generally the same disadvantages set forth above.

U.S. Pat. No. 3,515,373 discloses still another fence guard which includes an imperforate longitudinal channel portion which overlies the ground and opposes outwardly extending perforate lateral flange portions which are received beneath the ground to anchor the channel in position. This fence guard not only is far more difficult to install than the fence guard of the present invention, but it also fails to provide the same degree of protection when mowing closely adjacent the fence.

Accordingly, it is an object of the present invention to provide an improved fence guard for restricting the growth of grass, weeds and the like directly adjacent to or beneath a fence.

Still another object is to provide a fence guard of the above type which further prevents a mower from striking the fence when mowing directly adjacent to it.

A still further object is to provide an improved fence guard of the above type which can be inexpensively formed, and easily and quickly installed with existing or new fences.

Other objects of the invention will in part be obvious and will in part appear hereinafter.

For a fuller understanding of the nature and objects of the invention, reference should be had to the following detailed description taken in connection with the accompanying drawings in which:

FIG. 4 is a sectional view generally illustrating the manner in which two fence guards can be secured in place, on opposite sides of a fence;

FIG. 5 is a perspective view illustrating an inside corner;

FIG. 6 is a section view generally illustrating a fence guard formed to receive and retain the lower edge of a fence; and FIG. 7 is a sectional view of a fence guard having a securement stake or pin integrally affixed to it.

Similar reference characters refer to similar parts throughout the several views of the drawings.

Figure 1:
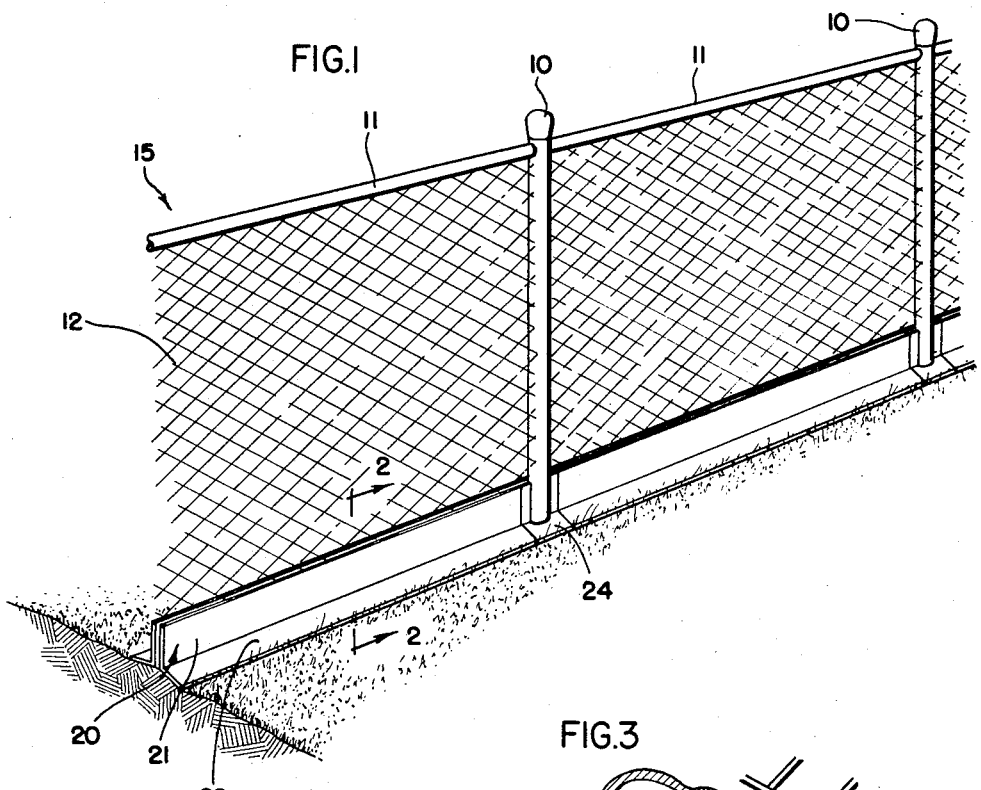
FIG. 1 is a perspective view of a fence, illustrating the manner in which a fence guard constructed or formed in accordance with one embodiment of the invention is installed.
Figure 2:
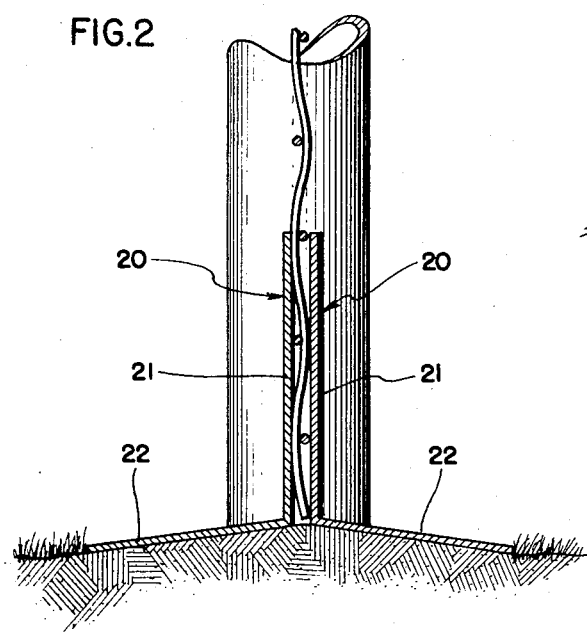
FIG. 2 is a sectional view taken generally along lines 2—2 of FIG. 1.
Figure 3:
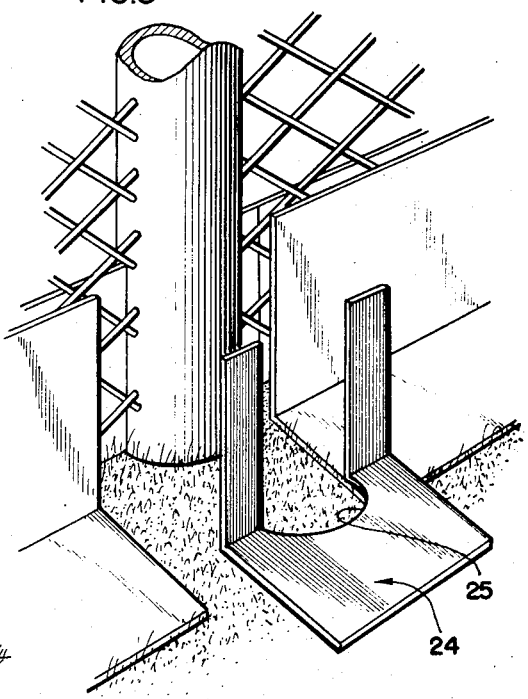
FIG. 3 is a perspective view generally illustrating the manner in which the fence guard is formed to fit about a fence post.

Referring now to the drawings, in FIGS. 1–3 there is illustrated a portion of a conventional metal fence 15 of the chain link type having regularly spaced posts 10, a top rail 11 extending between the posts 10, and either sections or a continuous length of open weave wire paneling 12.

A fence guard 20 is installed along the base or lower edge of the fence 15 and, as can be best seen in FIG. 2, in its most simple form, the fence guard 20 is L-shaped in cross-section having one leg 21 which is abutted against the fence in a vertically disposed position and the other leg 22 lying on the ground. The fence guard 20 can be formed and provided in a continuous length or, alternatively, it can be pre-cut to lengths corresponding to the span normally provided between the posts 10. As indicated above, a preferred material for the fence guard 20 is a plastic which is relatively rigid, however, materials such as wood, rubber, aluminum and tin, to mention several acceptable materials, can be used also.

The legs 21 and 22 are of a length to permit the wheels of a mower, for example, to be driven along the leg 22, with the leg 21 protecting the wheel from striking or engaging the fence and the leg 22 extending outwardly so that any growth at its edge can be cut with the mower when the latter's wheels are driven along the surface of the leg. Preferably the leg 21 is at least 4 inches or greater in length, while the leg 22 is at least 3 inches or greater in length, for these dimensions have been found such that the fence guard can be used with most fences and will function in the intended fashion. Also, it has been found that the fence guard 20 is less likely to be dislodged when the legs 21 and 22 are disposed at an angle slightly greater than 90° with respect to one another. For example, when disposed at an angle of approximately 97 ½°, the leg 22 when lying on the ground tends to forcibly urge the leg 21 to seat firmly against the fence, so that no additional securement means are necessary.

The fence guard 20 is easily and quickly installed, simply by placing the fence guard against the lower edge of the fence, with the leg 21 abutted against the fence and the leg 22 extending outwardly from the fence, flat or substantially flat on the ground. If the fence guard 20 is in the form of a continuous length, it can be cut to extend about the posts 10. Alternatively, pre-formed post sections 24 (FIG. 3) can be provided, in which case these post sections 24 can be provided with a cut-out 25 for receiving the posts 10. Similarly, inside corner sections 26 (FIG. 5) and outside corner sections (not shown) can be provided. These post and corner sections simply are installed in place, and the length of fence guard 20 then is formed or cut to extend between them, to form a continuous fence guard along the base of the fence.

As previously indicated, the leg 21 permits the wheels of a mower to be driven along the surface of the leg 21, without the wheels or the mower striking or otherwise engaging the fence so that both the mower and the fence are protected from damage. If prior to the installation of the fence guard there is a growth of grass, weeds or the like adjacent the fence, the leg 22 will restrict its further growth and, eventually, will cause the existing growth to die. Furthermore, since the leg 22 is of sufficient length to permit the mower to trim or cut any growth existing adjacent its edge, the lawn or yard can be neatly cut and trimmed simply by running the mower adjacent the fence with its wheels being driven on the surface of the leg 22.

The fence guard 20 can be installed along only one side of the fence or, alternatively, along both sides of it, as illustrated in FIGS. 1–3. If the fence guard it to be installed on both sides of the fence, a fence guard 30 of the construction illustrated in FIG. 6 can be used. The fence guard 30 generally is like two back-to-back fence guards 20 integrally affixed together in spaced-apart relation by a connecting web 31.

More particularly, the fence guard 30 has two legs 32 and 33 which are vertically disposed in spaced-apart relation so as to form a fence receiving channel 34 between them. Legs 35 and 36 extend horizontally outwardly in opposite directions from the base of the legs 32 and 33. These legs 32, 33, 35 and 36 function in the same manner as described above, in the case of the legs 21 and 22.

The fence guard 30 preferably and advantageously is formed of a flexible material such as rubber or plastic so that it can be easily installed with existing fences. If of a flexible material, one of the legs 32 and 33 is flexibly folded over to permit the fence guard 30 to be extended beneath the fence and, when properly positioned, released to receive and retain the fence within the fence receiving channel 34. If the fence guard 30 is of a rigid material, it can be installed during the erection of the fence.

In FIG. 4, there is illustrated still another fence guard 40 which is of a construction such that a fence guard can be installed on each of the opposite sides of a fence and affixed together. In this fashion, the fence is retained between the two fence guards to prevent them from being dislodged. Furthermore, the fence guards can be easily and quickly installed with existing fences, without the need of additional locking means.

This fence guard 40 is substantially like the fence guard 20 in that it is L-shaped in cross-section having legs 41 and 42. It differs from the fence guard 20, by the addition of locking means 43 integrally formed on the back side of the leg 41 and extending generally as an extension of the leg 42. These locking means 43 are formed to lockingly engage with the locking means 43 on another fence guard 40, so that the fence guards 40 are all of the same construction and can be used on either side of a fence. In the illustrated example, the locking means 43 are shown to include a pair of flexible fingers 44 and 45 having opposed facing V-shaped tips 46 on their ends. The locking means 43 are interlocked with one another simply by extending one of the fingers 44 and 45 on one of the fence guards between the fingers 44 and 45 on the other one of the fence guards. The V-shaped tips 46 lockingly engage to secure the two fence guards 40 together. While a specific construction for the locking means 43 is illustrated, numerous other constructions which will interlock with one another also can be used, the essence of the design being that one fence guard construction can be used on each of the opposite sides of a fence and can be lockingly affixed together to effectively secure the fence between them.

It may be desirable to secure the fence guard 20 in place. In such cases, one or more metal stakes or pins can be driven through the leg 22. Alternatively, one or more of such stakes or pins can be integrally affixed to the leg 21 by, for example, molding stakes or pins 51 into the leg 21, as illustrated in FIG. 7. These pins or stakes then are forced into the ground during installation, to secure the fence guards in place.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A fence guard for use in combination with a fence having posts in predetermined spaced apart relation to each other, said fence guard comprising an elongated length of material having a pair of first legs which are abutted against said fence in a vertically disposed position, and a pair of second legs which are disposed to lie on the ground extending outwardly in opposite directions from said fence, said two first legs being affixed to one another by means of a connecting member extending between said two first legs, said connecting member retaining said first legs of said fence guard in spaced apart relation to form a fence receiving channel therebetween, the length of said second leg being such as to permit a growth of grass and the like adjacent the edge thereof to be cut by a mower when the wheels of the latter are driven across the top surface of said second leg, the length of said first leg being such as to prevent a mower's wheels from striking said fence when said mower's wheels are being driven across the top surface of said second leg, said second leg restricting the growth of grass and the like in the area adjacent said frame which is covered by said second leg.

2. The fence guard of claim 1, wherein said two first legs are integrally affixed to one another by means of a connecting member extending between said two first legs, said connecting member retaining said first legs of said fence guards in spaced apart relation to form a fence receiving channel therebetween.

3. The fence guard of claim 1, wherein each of said first legs has interlocking means thereon which are adapted to lockingly engage with one another to secure said first legs together with said fence disposed and retained between them, to thereby prevent said fence guard from being dislodged.

4. The fence guard of claim 3, wherein said interlocking means are integrally formed with said first legs and are of identical construction.

* * * * *